United States Patent [19]

Tsukiyama

[11] Patent Number: 4,758,899
[45] Date of Patent: Jul. 19, 1988

[54] DATA COMPRESSION CONTROL DEVICE

[75] Inventor: Tokuhiro Tsukiyama, Nakagun, Japan

[73] Assignee: Hitachi, Ltd., Tokyo, Japan

[21] Appl. No.: 799,800

[22] Filed: Nov. 20, 1985

[30] Foreign Application Priority Data

Nov. 22, 1984 [JP] Japan .................. 59-247210

[51] Int. Cl.$^4$ .............................. G11B 5/00
[52] U.S. Cl. ............................ 360/8; 360/32
[58] Field of Search ........... 360/8, 32, 27; 358/261, 358/288; 375/31

[56] References Cited

U.S. PATENT DOCUMENTS

| | | | |
|---|---|---|---|
| 4,206,476 | 1/1980 | Hashimoro | 360/8 |
| 4,413,289 | 11/1983 | Weaver et al. | 360/8 |
| 4,517,596 | 5/1985 | Suzuki. | |
| 4,544,948 | 10/1985 | Odaka | 360/8 |

Primary Examiner—Vincent P. Canney
Attorney, Agent, or Firm—Antonelli, Terry & Wands

[57] ABSTRACT

A control device has a data compression control circuit for compressing data and a data buffer for temporarily storing the data to be written on a recording medium. The data transferred from a CPU is compressed and then recorded on the recording medium. Further provided is a buffer discriminating circuit for discriminating the quantity of data stored in the data buffer to control the data compression control circuit so that the data compressing operation and the operation of recording the data on the recording medium may be conducted in parallel while the amount of transferred data in the data buffer is prevented from becoming less than a predetermined quantity.

6 Claims, 4 Drawing Sheets

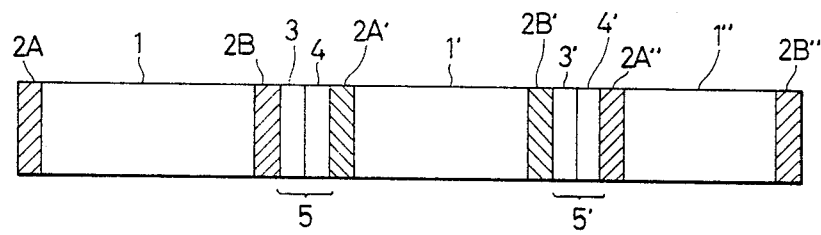

DATA COMPRESSION CONTROL DEVICE

BACKGROUND OF THE INVENTION

The present invention relates to a data compression control device and, more particularly, to a data compression control device in a data recording system for recording compressed data on a recording medium such as a magnetic tape.

As a device for recording compressed data at a constant rate on a recording medium such as a magnetic tape, there is known a data compressing circuit which is disclosed in Japanese Patent Laid-Open No. 58-102314, for example. This circuit performs data compression at a high rate by means of hardware. According to this technique, the number of bytes of the compressed data may increase to an amount which is more than that of the data before the compression. With this circuit, therefore, the number of bytes of the compressed data and the number of bytes of the uncompressed data are compared so that the data having fewer bytes is written on the recording medium. After all the data transferred has been compressed, however, the number of bytes before and after compression is compared, and data is then written on the recording medium. This makes it necessary to provide a data buffer having a capacity sufficient to store all the compressed data temporarily in the buffer. Moreover, there arises a problem that a delay occurs in the data processing period after the data has been transferred from a CPU, written on the recording medium and confirmed to be correct and before the CPU and the recording system are disconnected.

When the compressed data is written on the recording medium at a constant rate before completion of data transfer from the CPU, a defect results in that the data to be written on the recording medium is exhausted causing an overrun error when the coefficient of compression is extremely high.

SUMMARY OF THE INVENTION

An object of the present invention is to provide a data compression control device which can start the recording of compressed data on a recording medium before completion of data transfer from a control device such as a CPU when the data is to be compressed and recorded on the recording medium.

Another object of the present invention is to provide a data compression control device which can shorten the data processing period before the CPU and a recording device are disconnected, without causing an overrun error.

The above-specified objects are realized by a control device which comprises: a data compression circuit for compressing data; and a data buffer for temporarily storing the data to be stored on a recording medium such as the magnetic tape, whereby the data transferred from a control device is compressed by the data compression circuit so that it may be recorded at a constant rate in the recording medium. According to the present invention, moreover, the control device further comprises discrimination means for discriminating the quantity of the data stored in said data buffer to control said data compression circuit thereby to prevent the data which is being transferred from the control device from becoming less in said data buffer than a predetermined quantity so that data compression and recording may be conducted in parallel.

According to the present invention, by using a data compression format in which the coefficient of data expansion is low when the compression is the least, it is possible to execute in parallel the operations of compressing data from the control device and writing the compressed data at a constant rate on the recording medium. In order to prevent the data in the data buffer from being exhausted and overflowing during the parallel processing operation, moreover, by discriminating the number of the residual data bytes of the data buffer by said discrimination means to control said data compression circuit, it is possible to make the capacity of the data buffer less than the number of the written data bytes and to shorten the real data transfer period before the control device and the recording device such as the magnetic tape device have been disconnected.

BRIEF DESCRIPTION OF THE DRAWINGS

FIG. 1 a diagram showing a format of the data to be recorded on a magnetic recording medium such as a magnetic tape;

FIGS. 2(A) and 2(B) are diagrams for explaining a data compression operation;

DESCRIPTION OF THE PREFERRED EMBODIMENT

Figure 3:
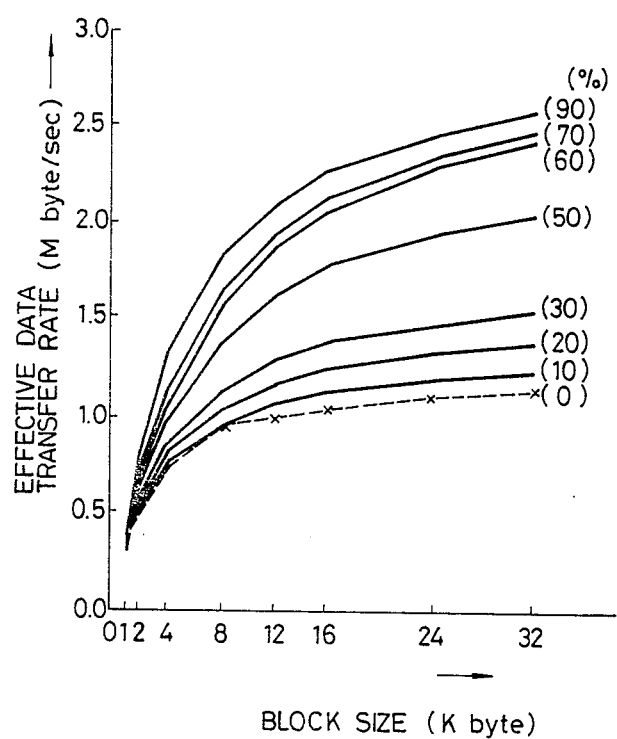
FIG. 3 is a graph depicting a data compressibility factor in connection with the relationship between a block size and an effective data transfer rate.

The present invention will be described in connection with one embodiment thereof with reference to the accompanying drawings. FIG. 1 is a diagram showing the data format to be written on a magnetic recording medium such as a magnetic tape.

In the present invention, there is used a data format of data compression type, in which the coefficient of expansion of compressed data is remarkably low when the data compression is executed. Thus, any comparison between the original data and the compressed data is not made as in the prior art, but the data transferred from a CPU can be compressed and stored in a data buffer while the data in the data buffer can be recorded in parallel in the recording medium.

Indicated at reference numerals 1, 1', and 1" in FIG. 1 are first areas in which uncompressed data is arrayed. Before and after these areas, there are positioned areas in which items of control information 2A, 2B, 2A'. 2B'. 2A" and 2B" are to be recorded. Here, the control information 2A and 2B is recorded with the length of the area 1, i.e., the numerical information which indicates the number of bytes of data contained in area 1 in hexadecimal notation, for example. The control information 2A and 2B is paired, 2A and 2B having identical content. Likewise, the control information 2A' and 2B', and 2A" and 2B" is recorded with the information which indicates the length of the areas 1' and 1", respectively.

Second areas 5 and 5', which are interposed between the first areas and sandwiched between 2B and 2A' and between 2B' and 2A", are provided to record the data which has been subjected to compression. Those second areas are recorded with 1-byte data 3 and 3' and the numerical information 4 and 4', which indicate the number of bytes in the series of the aforementioned data in the original data train in hexadecimal notation, for example.

The data compression in the aforementioned data format is conducted in a way such that identical data continues in a plurality or, desirably, more than a number of bytes n required for one second area and two adjacent control information items, for the original data train which is output from the CPU to the magnetic tape device.

This is because, if compression is executed when the number of bytes in the series of identical data is not more than n, the recording medium, which is occupied both by the control information 2B and 2A' for indicating the compressed data area discriminated from the first area and by the information 4 indicating the number of bytes therein, is a series longer than the medium required when data is recorded with the original data array, thereby losing the benefit of the data compression.

FIGS. 2(A) and 2(B) are diagrams for specifically explaining the aforementioned data compression. FIG. 2(A) shows the format of the original data before compression, and FIG. 2(B) shows the data format of the compressed data. Now, if it is assumed that one byte is assigned to the individual control information 2A, 2B and so on, the length of the data block of a first area to be indicated by the control information is 256 bytes at the maximum. If it is also assumed that the data 3 and the information 4 indicating the number of bytes in the series of identical data is indicated by one byte, and the condition for the data compression corresponds to the case in which the number of bytes in the series of identical data is 4 bytes or more.

In the example shown in FIG. 2(A), two hexadecimal data items, each having a value of "00" are at positions a and b in the original data train, which fails to satisfy the conditions for compression. This condition for compression is satisfied by the portion of the data "04" which occupies 18 positions from position f to position w indicated by 12 positions expressed in hexadecimal notation. As shown in FIG. 2(B), therefore, in the data format after compression, 5-bytes of data from positions a to e are recorded in the original array in area 1 and are sandwiched between control information 2A and 2B indicating a 5-byte length. The compression area 5 is recorded with both the pattern data 3 indicating that the pattern compressed is "04" and the number indicating information 4 indicating that the number of bytes in the series is $(12)_{16}$. The x-th and later data are also judged as to whether or not the series data satisfying the compression condition is present. In this example, however, it is indicated that no corresponding portion is present up to the data position 2 where the block terminates. As a result, the area 1' is recorded with data positions x to z as they are in the array and is sandwiched between information 2A' and 2B' indicating the length of the area 1'.

If there should be no data portion satisfying the compression condition in the data block processed, moreover, control information is provided at 256 byte intervals on the recording format, and the value "00" is inserted into information 4 indicating the number of bytes in the series. At this time, data 3 may take any value. The expansion by adding information accompanying compression in this case increases about 1.5%. If the value of control information 2A and 2B is 2 bytes, moreover, expansion in a case similar to the above case can be reduced to an increase of 0.01%. Since this value is related to control when data compression and writing are executed in parallel, as is evident, it should be selected so as to be a suitable value.

When data compression and writing are executed in parallel, if the coefficient of compression is too high, data is so compressed that it becomes too short to be written on the recording medium. This makes it desirable to control the data compression control circuit such that the quantity of the data to be written on the recording medium, i.e., the quantity of the data in the data buffer, is so discriminated at all times that it may be prevented from becoming less than a predetermined value.

The data transferred from the CPU is stored in the data buffer and is compressed to dictionary data by an in-buffer control circuit and a dictionary buffer control circuit until it is stored in a dictionary buffer. The data to be written on the recording medium is that in the dictionary buffer and in the data buffer, but writing control is conducted by the control information in the dictionary buffer.

If the data compression is too high, the data to be written on the recording medium is exhausted. By discriminating the number of bytes in the data buffer at all times to control data compression control logic so as to prevent the data in the buffer from being exhausted, it is possible to perform compression of data in parallel and writing of data on the recording medium at a constant rate.

FIG. 3 is a graph depicted the coefficient of compression derived from the relationship between the block size and the effective data transfer rate.

It is assumed that the present invention is applied to a magnetic tape control device having a transfer rate of 1.25 Mbytes/sec, for example. When the interface between the control device, the CPU, and the magnetic tape device is set at 3 Mbytes/sec, the effective data transfer processing time rate against the CPU for the block size when data compression and writing are started in parallel and when the data compression control circuit is so controlled at all times as to have a compressibility factor not more than 60% is depicted in FIG. 3.

FIG. 3 indicates that data transferred from the CPU can be continuosly compressed by the parenthesized values. In this case, a compressibility factor of 60% or more is controlled by the data compression control circuit, and a data block of 32 Kbytes capable of being compressed by 90% is controlled to have a data compressibility factor of 60% after compression and writing are conducted in parallel. The effective data transfer rate at this time is about 2.5 Mbytes/sec.

In addition to the data compression control method for holding the compressibility factor at a constant value, as shown in FIG. 3, there is another method by which the ON-OFF control of the data compression operation can be conducted such that the number of bytes of data left in the data buffer is never lower than a predetermined value during the parallel operation.

The embodiment is applied to a magnetic tape control device having a transfer rate of 1.25 Mbytes/sec but can conduct processing at a rate of 2.5 Mbytes/sec.

Figure 4:
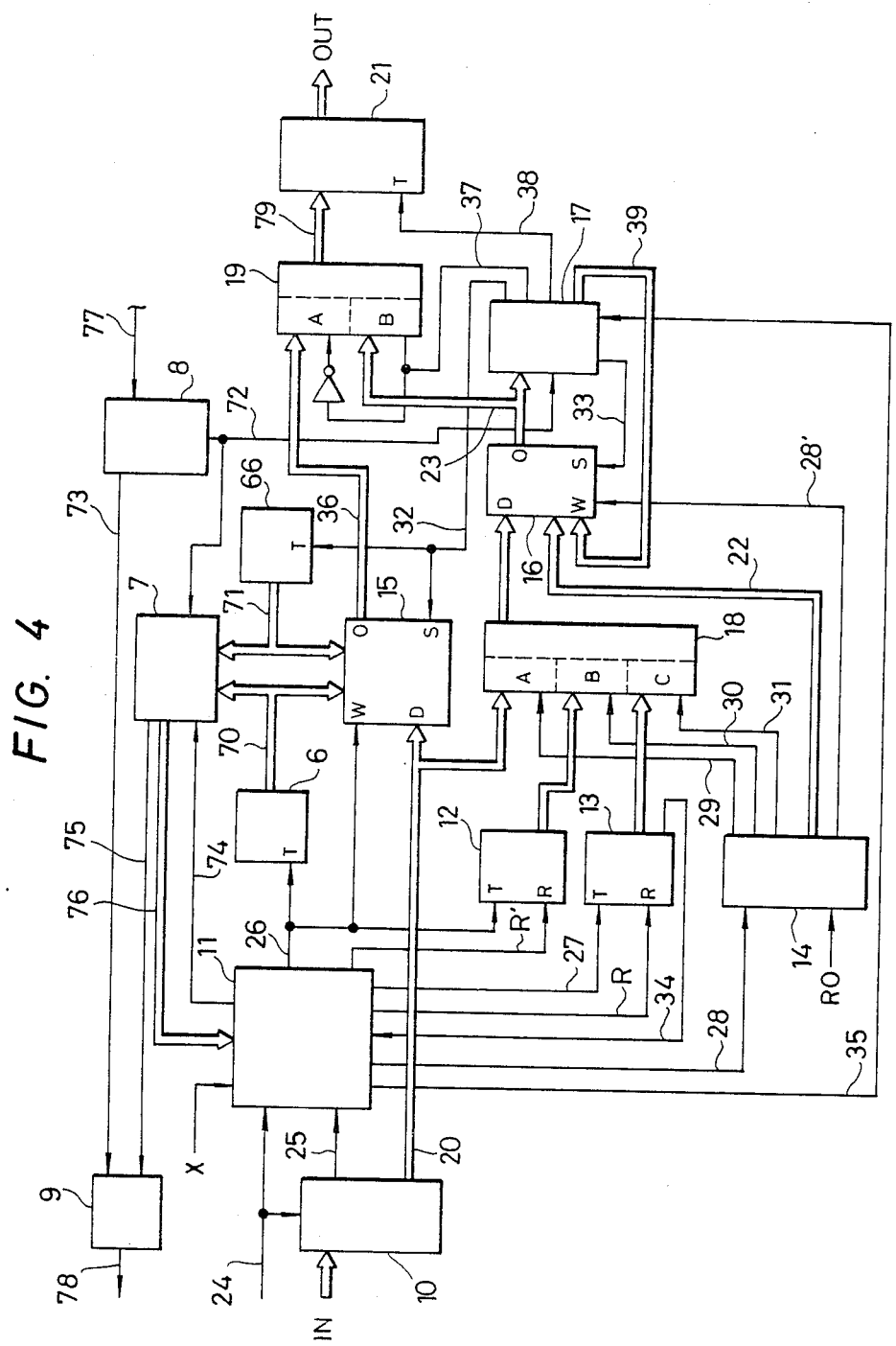
FIG. 4 is a block diagram showing a data compression control unit of a magnetic tape control system according to one embodiment of the present invention.
Figure 5:
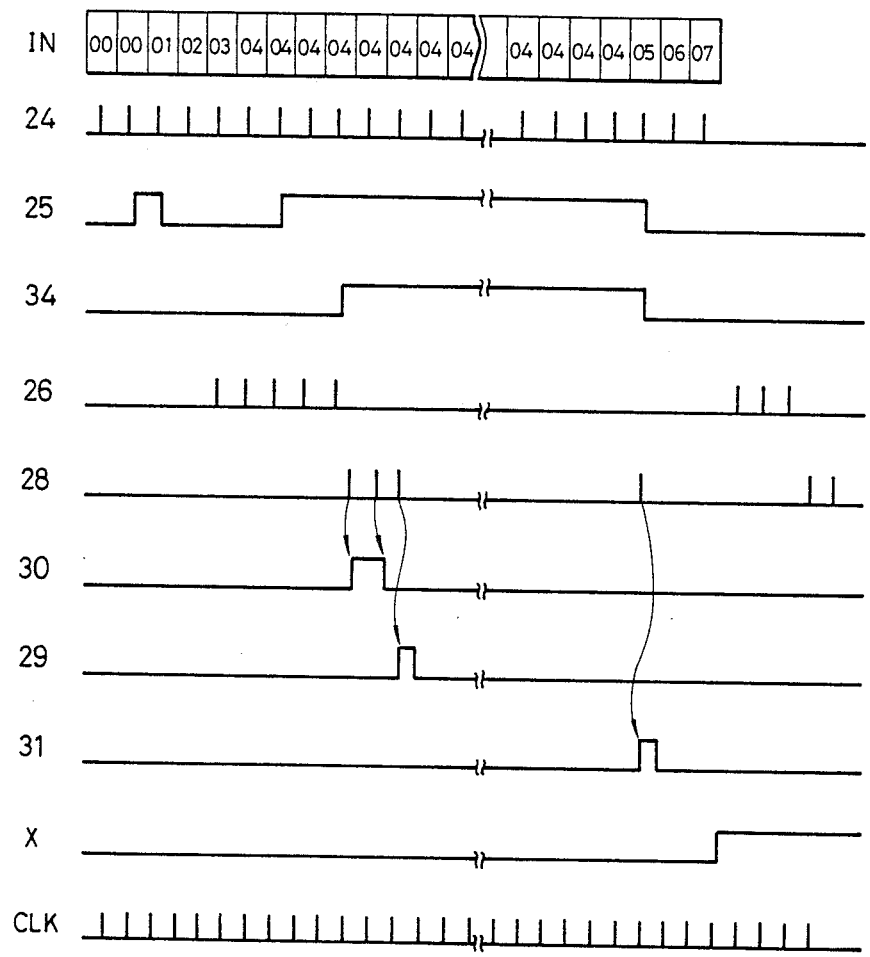
FIG. 5 is a time chart of signals for explaining the operations of the data compression control unit shown in FIG. 4.

FIG. 4 is a block diagram showing the data compression control unit of the magnetic tape control device according to the embodiment of the present invention, and FIG. 5 is an operation time chart of the signals of FIG. 4.

In FIG. 4, a data train IN transferred from the CPU is processed and output as a compressed data train OUT until it is transferred to a recording medium driving device.

In FIG. 4: reference numeral 10 indicates a data input circuit; numeral 11 an in-buffer control circuit; numeral 15 a data buffer; numeral 16 a dictionary buffer; numeral 17 an out-buffer control circuit; numerals 18 and 19 selectors; numerals 12 and 13 counters; numeral 14 a dictionary buffer control circuit; numeral 21 a write data register; numeral 6 a counter; numeral 66 a read counter; numeral 7 a data buffer byte number discriminator; numeral 8 a microprocessor; and numeral 9 a data transfer control circuit.

When the magnetic tape control device has been ordered to perform a data write operation by the CPU, a signal is sent from the microprocessor 8 through a signal line 73 to the data transfer control circuit 9 to indicate that the operation has started. When the data IN synchronized with a timing signal 24 is transferred one byte at a time from the CPU in response to a data request signal 78 from the data transfer control circuit 9, it is taken sequentially into the input circuit 10.

With this data transfer between the CPU and the magnetic tape control device, the magnetic tape device is started by the magnetic tape control device, while assuming mutual connection, to start the operation of the magnetic tape. When the speed of the magnetic tape has become constant, the magnetic tape control device successively outputs the data request signal 78 to the CPU to receive the data transferred from the CPU, thus effecting data compression.

The input circuit 10 is composed, for example, of an input buffer circuit having plural stages of shift registers conforming to the compression condition; and a comparator for comparing the data of the shift registers at the first and second stages to detect the continuity of the data pattern. While the data of the same pattern is being received continuously, the input circuit 10 outputs a data-match signal 25, as shown in FIG. 5.

The in-buffer control circuit 11 having a variety of counters built therein controls the introduction of the output data from the input circuit 10 into the data buffer 15. Moreover, the in-buffer control circuit 11 outputs pulses 27 to the counter 13 in response to the timing signal 24, when the data-match signal 25 is ON, and outputs timing pulses 28 for storing the control information in the dictionary buffer control circuit 14, as will be described hereinafter, when the conditions are satisfied for compression.

The counter 13 is constructed of a counter for counting pulses 27, a latch circuit for latching the count, and a comparator for detecting that the count exceeds a predetermined value n satisfying the condition for data compression. When the counted value exceeds n, i.e., when identical data of n bytes or more is received continuously by the input circuit 10, the counter 13 outputs a compression indicating signal 34. This counter 13 continues to count until it receives a reset signal R output from the control circuit 11, when the data-match signal is interrupted, and transfers the count to the latch circuit and clears the latch to zero, when it receives the reset signal R, to return the signal 34 to the OFF state.

The counter 12 counts the number of bytes of series data to be introduced into the data buffer 15 without compression, i.e., the length of the aforementioned first area, and counts introduction timing pulses 26 from the in-buffer control circuit 11 to the data buffer 15.

This counter 12 is reset by a reset signal R′ output from the control circuit 11 when the coincidence signal 25 is interrupted again once the output signal 34 of the counter 13 has been turned ON.

The counter 6 indicates the address of the data buffer 15 when data is to be written from the input circuit 10 in the data buffer 15, and is incremented by the timing pulses 26 which are output from the in-buffer control circuit 11.

The in-buffer control circuit 11 generates the aforementioned timing pulses 26, while the signal 34 is OFF, in conformity to the data output timing from the shift register at the final stage of the input circuit 10. When identical data continues, the output of the aforementioned timing signal 26 continues while the number of successive bytes is less than a predetermined value n. At the instant when the number of successive bytes reaches the value n, i.e., when the signal 34 is turned ON, the output of the timing signal 26 is interrupted. At this instant, only data having identical patterns is present at the respective stages of the shift register in the input circuit 10 so that all the data of the first area to be stored in the data buffer 15 has been outputted to the last. In case the signal 34 is returned from its ON state to its OFF state, the in-buffer control circuit 11 counts the number of the data shifts in the input circuit 10 to restart generation of the timing pulses 26 in conformity to the timing at which the different data is output from the input circuit 10.

In response to the compression command 34 from the counter 13, as shown in FIG. 5, the in-buffer control circuit 11 gates an internal clock pulse CLK of the in-buffer control circuit 11 to generate pulses 28. This clock pulse CLK is sufficiently shorter than the period of the timing signal 24. The dictionary buffer control circuit 14 counts the input pulses 28 from the in-buffer control circuit 11 to output the counted value to an address line 22 of the dictionary buffer 16.

The dictionary buffer control circuit 14 selectively generates, in addition to the aforementioned address signal 22, a data input timing signal 28′ which is input to the dictionary buffer 16, and three select signals 29, 30 and 31 which are input to the selector 18. These select signals are normally OFF, and the select signal 30 is turned ON when the first pulse 28 is input from the in-buffer control circuit 11. The aforementioned select signal 30 also acts as a gate signal for selecting the output of the counter 12 and is turned OFF when the third pulse 28 is output from the in-buffer control circuit 11. Since the dictionary buffer control circuit 14 generates the address signal 22 and the data introduction timing signal 28′ in response to each of the pulses 28, the value indicating the number of bytes held in the counter 12 is introduced twice in sucession into the dictionary buffer 16 in response to the output of the aforementioned select signal 30. This numerical data correspond to the two control information items 2A and 2B which have already been described with reference to FIG. 1. In response to the third pulse 28 from the in-buffer control circuit 11, the dictionary buffer control circuit 14 turns the select signal 30 OFF and the select signal 29 ON to introduce the data on a data line 20 into the dictionary buffer 16. At this time, since the series data to be compressed is being output on the data line 20, the dictionary buffer 16 consequently receives the data corresponding to the data 3 in FIG. 1.

When the data-match signal 25 is interrupted, the fourth pulse 28 is output so that the dictionary pattern control circuit 14 turns the select signal 31 ON. In response to this select signal 31, the output of the counter 13 is introduced into the dictionary buffer 16. Since the counter 13 holds the amount of the data to be compressed at the instant when the fourth pulse 28 is output, the numerical information 4 of FIG. 1 is consequently stored in the dictionary buffer 16.

By repeating the operation thus far described, the discontinuous data or the continuous data failing to satisfy the conditions for compression is stored sequentially in the buffer 15 so that continuous data satisfying the conditions for compression is stored in the dictionary buffer 16 while being compressed and accompanied by the sandwiched information. When the microprocessor 8 recognizes through a signal line 77 that the magnetic tape is running at a constant speed, it outputs a buffer read starting signal 72 to the out-buffer control circuit 17 and the discriminator 7. In response to the read starting signal 72, the out-buffer control circuit 17 receives a buffer readable signal 35, which insures that the output signals 26 and 28 of the in-buffer control circuit 11, i.e., the output signal 28' of the dictionary buffer control circuit 14, are not output, and shares and outputs read signals 32 and 33 to the respective buffers by making use of the intermission of the writing timings of the individual buffers. The data of the data buffer 15 and the data of the dictionary buffer 16 are sequentially read out in response to the signals 32 and 33, respectively.

First of all, the first method of first reading the dictionary buffer 16 outputs the read signal 33 of the buffer by turning ON a select signal 37 of the control circuit 17 and by setting an address information 39 of the dictionary data at "0". As a result, the output data from the dictionary buffer 16 is introduced through the selector 19 into the write data register 21 and is set to an OUT signal in response to a timing signal 38. After this, as the signal 33 is turned OFF, the address information 39 is simultaneously incremented to "1". The first output from the dictionary buffer 16 is control information 2A. Unless control information 2A is at zero, the control circuit 17 turns the select line 37 OFF to cause the selector 19 to select an output 36 of the data buffer 15. In this state, the read signal 32 is sent out to the data buffer 15 and to the read counter 66 indicating the read address of the data buffer 15. At this time, since the read counter 66 has a counted value "0", the data at the "0" address of the data buffer 15 is set to the OUT signal in the write data register 21 through the selector 19 in response to the introduction timing signal 38. After this, the signal 32 is turned OFF so that the read counter 66 is incremented to indicate the counted value "1". The control circuit 17 repeats the outputs of the read signal 32 and the data introduction timing signal 38 by the number of sequences indicated by the control information 2A, and the data buffer 15 sequentially outputs the data in the stored order in accordance with the value of the counter 66 which is incremented in response to the read signal 32.

When a predetermined amount of data has been read from the data buffer 15, the control circuit 17 switches the selector 19 to the dictionary buffer 16 to read control information 2B, the data 3 and the numerical information 4 sequentially from the dictionary buffer 16 while renewing the address 39. When the next control information 2A is read out subsequent to the control information 2B, the aforementioned operations are repeated so that the data of one block is output to the output line OUT in accordance with the format of FIG. 1.

The byte count discriminator 7 discriminates, when it is started by the signal 72 from the microprocessor 8, the value 70 of the counter 6 and the value 71 of the counter 66 continuously during its operation. When a data transfer termination signal X is fed from the CPU to the in-buffer discriminator 11, the operation of the discriminator 7 is interrupted in response to the information on signal line 74. The discriminator 7 outputs an interrupt to a signal line 76 when the difference between the counters 6 and 66 is equal to or less than a predetermined value M. In response to this, the data compression control circuit 11 interrupts compression to conduct the same processing as that when all the data fails to satisfy conditions for data compression. As a result, the data processing rate of the magnetic tape device is delayed so as to be slower than the data transfer rate with the CPU so that the amount of data is increased and stored in the data buffer 15. After this, when the difference between the counters 6 and 66 as detected by the discriminator 7 takes a constant value L ($L \geq M$), the signal line 76 is turned OFF to cause the data compression control circuit 11 to conduct the normal data compressing operation again. That signal line 76 can be used not only for the aforementioned ON-OFF control but also for incremental control as the bus control line. If the differences between the information items 70 and 71 is set at O, P and Q, for example, the meaning concerning the aforementioned value N is made $N<O<P<Q$ indicating their relationship so that the data compression controlling operations can be executed more finely by incrementally switching the conditions for compression.

In order to prevent the overflow of the data buffer 15 when the target data fails to conform to the conditions for data compression, a signal line 75 sends information to the data transfer control circuit 9 to interrupt the output of the data request signal 78 when the difference between the information 70 and 71 reaches 85%, which value may take any value below 100%, of the capacity, i.e., the overflow value, of Y bytes of the data buffer 15. While the data is being output to the magnetic tape device from the data buffer 15, the signal line 75 is turned OFF when the difference between information 70 and 71 becomes not more than 85%, so that the data transfer control circuit 9 sends the request signal 78 to the CPU to request the data. By repeating the operations thus far described, the data IN is compressed and output.

When data transfer is complete, the data transfer termination signal X is sent from the CPU to the in-buffer control circuit 11. In response to this signal X, the in-buffer control circuit 11 processes the data left in the input circuit 10 in accordance with the internal clock CLK. In the example of FIG. 5, the data (i.e., "05", "06" and "07") held in the input circuit 10 is introduced into the data buffer 15 in response to the timing signal 26 output after the reception of the termination signal X, and the control information 2A" and 2B" are introduced into the dictionary buffer 16 in response to the signal 28 output thereafter. Thus, the processing of residual data in the input circuit 10 is complete.

The relationship between the capacity of Y bytes of the data buffer 15 and the value M of the data compression control of the ON-OFF type will be considered for a magnetic tape control device. The capacity Y of the buffer should be adequate to store as much data as possible in the data buffer 15 from the CPU for the time period after the tape has started running and before it stabilizes at a constant speed, if the effective coefficient of data compression and the real data transfer rate are taken into consideration. In this case, if the rising time of the tape speed is set at 1 msec and if the data transfer rate with the CPU is set at 3 Mbyte/sec, the quantity to be stored in the data buffer 15 reaches about 3 Kbytes.

The value M to be used in the discriminator 7 may be any for the control information 2A and 2B of 1 byte if it is made to be 110 bytes or more as can verify the data in the data buffer 15 when the data in the buffer 15 is read at a rate of 1.25 Mbyte/sec while 256 bytes of data are being received at a rate of 3 Mbytes/sec from the CPU, because the largest number of bytes providing the unit when writing data in buffer 15 and reading data from buffer 15 are conducted in parallel repeatedly is 256 bytes.

What is claimed is:

1. A data compression control device for use with a data recording system, comprising:
    (a) input means for providing binary data to be recorded on a recording medium;
    (b) compression means for selectively compressing said binary data to be recorded by replacing data comprised of identical patterns in said binary data with an indication of the data and the number of repetitions of said data;
    (c) storage means for temporarily storing the data compressed by said compression means and non-compressed data;
    (d) monitor means for monitoring the quantity of non-compressed data stored in said storage means; and
    (e) control means responsive to a signal from said monitor means for controlling the quantity of the data to be fed to said compression means such that the amount of non-compressed data in said storage means may become not less than a predetermined value.

2. A data compression control device according to claim 1, wherein said compression means includes means for detecting data composed of identical patterns and the number of repetitions of said data.

3. A data compression control device according to claim 1, wherein said storage means includes first memory means for storing the data compressed by said compression means and second memory means for storing the non-compressed data.

4. A data compression control device according to claim 3, wherein said monitor means includes means for determining the amount of non-compressed data in said second memory means by monitoring the difference between the amount of data inputted to said second memory means and the amount of data outputted therefrom, and wherein said control means includes means for stopping the operation of said compression means and feeding non-compressed data from said input means to said second memory means while said monitor means indicates that said difference is less than a predetermined value.

5. A data compression control device for use in a data recording system, comprising:
    (a) an input circuit for receiving binary data to be recorded on a recording medium;
    (b) first counter means for counting the number of bytes in a series of data of identical pattern in response to receipt of the data of identical pattern successively by said input circuit;
    (c) first means for compressing and storing said series of data received from said input circuit on condition that said first counter has counted a predetermined value or more;
    (d) second means for storing uncompressed data received from said input circuit on condition that said first counter means fails to count to at least said predetermined value;
    (e) selector means for outputting the data selectively received from said first or second means to said recording medium; and
    (f) control means for monitoring the quantity of the data in said second means to interrupt compression by said first means when the amount of the data is equal to or less than a predetermined value.

6. A data compression control device according to claim 5, wherein said control means includes second counter means for counting the amount of data to be input into said second means; and third counter means for counting the quantity of the data to be output from said second means so as to check the difference between the values indicated by said second and third counter means to monitor whether said difference is equal to or larger than a predetermined value.

* * * * *